United States Patent
Berrajaa et al.

(10) Patent No.: US 9,785,144 B2
(45) Date of Patent: Oct. 10, 2017

(54) METHOD AND DEVICE FOR AUTOMATICALLY MANAGING AIR OPERATIONS REQUIRING A GUARANTEE OF NAVIGATION AND GUIDANCE PERFORMANCE OF AN AIRCRAFT

(71) Applicant: Airbus Operations (S.A.S.), Toulouse (FR)

(72) Inventors: Jaouad Berrajaa, Plaisance du Touch (FR); Jean-Damien Perrie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/806,209

(22) Filed: Jul. 22, 2015

(65) Prior Publication Data

US 2016/0026178 A1 Jan. 28, 2016

(30) Foreign Application Priority Data

Jul. 23, 2014 (FR) ..................................... 14 57106

(51) Int. Cl.
  *G08G 5/00* (2006.01)
  *G05D 1/00* (2006.01)
  *G01C 23/00* (2006.01)

(52) U.S. Cl.
  CPC .............. *G05D 1/00* (2013.01); *G01C 23/00* (2013.01); *G08G 5/0047* (2013.01)

(58) Field of Classification Search
  CPC ....... G08G 1/096844; G08G 1/096827; G08G 1/096716; G08G 1/096775;

(Continued)

(56) References Cited

U.S. PATENT DOCUMENTS

| 8,112,188 B2* | 2/2012 | Rouquette ............ G05D 1/0676 340/947 |
| 2005/0071206 A1* | 3/2005 | Berge ................... G06Q 10/047 705/6 |

(Continued)

FOREIGN PATENT DOCUMENTS

| FR | 2 897 712 A1 | 8/2007 |
| FR | 2 966 259 A1 | 4/2012 |

OTHER PUBLICATIONS

French Search Report for Application No. 1457106 dated Mar. 25, 2015.

*Primary Examiner* — Nicholas Kiswanto
*Assistant Examiner* — Kenny A Taveras
(74) *Attorney, Agent, or Firm* — Jenkins, Wilson, Taylor & Hunt, P.A.

(57) ABSTRACT

Method and device for automatically managing air operations requiring a guarantee of navigation and guidance performance of an aircraft. The device for automatically managing at least one air operation comprises activatable monitoring of the air operation, a computation unit configured to automatically calculate an anticipated activation point as a function of the application point of the air operation, this anticipated activation point being defined upstream of the application point in the direction of flight of the aircraft, and an activation unit configured to automatically activate monitoring and a display when the aircraft reaches, during its flight, the anticipated activation point.

10 Claims, 1 Drawing Sheet

(58) Field of Classification Search
CPC ......... G08G 1/09675; G08G 1/096811; G08G 1/096816; G08G 1/096838; G08G 1/00; G08G 1/0112; G08G 1/0129; G08G 1/096861; G08G 1/096741
See application file for complete search history.

(56) References Cited

U.S. PATENT DOCUMENTS

| | | | |
|---|---|---|---|
| 2012/0092193 A1* | 4/2012 | Perrie | G05D 1/0077 340/979 |
| 2012/0150366 A1* | 6/2012 | Potagnik | G06F 11/184 701/3 |
| 2012/0173052 A1* | 7/2012 | Nicolas | G08G 5/0039 701/3 |
| 2012/0296496 A1* | 11/2012 | Hedrick | G08G 5/0021 701/3 |
| 2014/0343845 A1* | 11/2014 | Choi | G01C 21/3438 701/522 |
| 2015/0015421 A1* | 1/2015 | Krijger | G08G 1/0129 340/932 |
| 2015/0378358 A1* | 12/2015 | Gutierrez-Castaneda | B64C 13/18 701/8 |
| 2016/0026178 A1* | 1/2016 | Berrajaa | G05D 1/00 701/467 |
| 2017/0008640 A1* | 1/2017 | Mere | G05D 1/0077 |

* cited by examiner

METHOD AND DEVICE FOR AUTOMATICALLY MANAGING AIR OPERATIONS REQUIRING A GUARANTEE OF NAVIGATION AND GUIDANCE PERFORMANCE OF AN AIRCRAFT

CROSS-REFERENCE TO RELATED APPLICATION

This application claims priority to FR 14 57106 filed Jul. 23, 2014, the entire disclosure of which is incorporated by reference herein.

TECHNICAL FIELD

The present disclosure relates to a method and a device for automatically managing air operations requiring a guarantee of navigation and guidance performance of an aircraft, in particular of a transport aircraft.

The present disclosure applies to operations with required navigation performance with authorization required of the RNP AR (Required Navigation Performance with Authorization Required) type. These RNP AR operations are based on area navigation of the RNAV (aRea NAVigation) type and on operations with required navigation performance operations of the RNP (Required Navigation Performance) type. They have the peculiarity of requiring special authorization in order to be able to be used on an aircraft.

Area navigation of the RNAV type allows an aircraft to fly from waypoint to waypoint, and no longer from ground stations (of radio navigation means of the NAVAID type) to ground stations.

BACKGROUND

It is known that the RNP concept corresponds to area navigation, for which are added (on board the aircraft) monitoring and warnings which make it possible to ensure that the aircraft remains in a corridor, called RNP, around a reference trajectory and which authorize the taking into account of curved trajectories. Outside of this corridor, there is potentially relief or other aircraft. The required performance for an operation of the RNP type is defined by an RNP value which represents the half-width (in nautical miles: NM) of the corridor around the reference trajectory, within which the aircraft must remain for 95% of the time during the operation. A second corridor (around the reference trajectory) having a half-width of twice the RNP value is also defined.

The concept of RNP AR operations is yet more restrictive. The RNP AR procedures are in fact characterized by:
RNP values:
which are less than or equal to 0.3 NM on approach, and which can drop to 0.1 NM; and
which are strictly less than 1 NM on departure and during a go-around, and which can also drop to 0.1 NM;
a final approach segment which can be curved; and
obstacles (mountains, traffic . . . ) which can be situated at twice the RNP value with respect to the reference trajectory whereas, for the usual RNP operations, an additional margin with respect to obstacles is provided.

The air authorities have defined a target level of safety TLS (Target Level of Safety) of $10^{-7}$ per operation, whatever its type may be. In the case of RNP AR operations, as the RNP values can drop to 0.1 NM and the obstacles can be situated at twice the RNP value from the reference trajectory, this target is represented by a probability that the aircraft exits from the corridor of half-width D=2.RNP which must not exceed $10^{-7}$ per procedure.

In order to meet these requirements, the automated flight management system of the aircraft uses architectures and monitoring which makes it possible to attain the safety level set by the air authorities. These specific architectures and monitoring are not used in the flight phases outside of RNP AR operations and must therefore be activated at the opportune time in order to make it possible to carry out the RNP AR operation in total safety.

Moreover, RNP AR operations can be constructed on the basis of several possible RNP levels, allowing increasingly low landing minimums. The crew must choose the RNP value to be used according to the capabilities of the aircraft and of the crew, and to current meteorological conditions. This value is defined by the crew in the flight management system at the moment when the operation must start.

Now, the activation of the architectures and monitoring specific to the RNP AR operations, although automatic, is initiated only when the aircraft is engaged in this operation. This late activation does not allow the crew to evaluate the real capabilities of the aircraft sufficiently upstream of the engagement of the operation and therefore does not allow the use of an alternative strategy if necessary (such as carrying out another type of approach for example).

SUMMARY

A purpose of the present disclosure is to overcome this disadvantage.

It relates to a method for automatically managing at least one air operation requiring a guarantee of navigation and guidance performance of an aircraft, the air operation being defined by management parameters and being monitored by activatable monitoring also referred to as a monitor, the implementation of the air operation being initiated at an application point.

According to the disclosure herein, the automatic management method comprises:
automatically calculating at least one anticipated activation point as a function of the application point, the anticipated activation point being defined upstream of the application point in the direction of flight of the aircraft; and
automatically activating at least the monitoring when the aircraft reaches, during its flight, the anticipated activation point.

Thus, thanks to the disclosure herein, by anticipating the activation of the monitor or monitoring with respect to a usual activation, the crew can evaluate the real capabilities of the aircraft and in particular the possibility of carrying out the foreseen air operation sufficiently upstream of the engagement of this operation (at the activation point). It thus has time, if necessary, to take appropriate actions and notably to set up an alternative strategy, as described below.

According to different embodiments of the disclosure herein, which can be taken together or separately:
the method comprises displaying information relative at least to monitoring(s) implemented by the monitor, at the time of the automatic activation of the monitor or monitoring;
the calculation of the anticipated activation point is carried out by an anticipation in distance, with respect to the application point;
the calculation of the anticipated activation point is carried out by an anticipation in flight time, with respect to the application point;

the method comprises a prior step of providing a crew member of the aircraft with the opportunity to define at least one management parameter from among the following management parameters:
  an RNP value representing the half-width of a safety corridor relative to the air operation;
  the application point;
  an item of information relative to an anticipation of activation in time or in distance;
  an alternative strategy to be used in the case where it is impossible for the aircraft to carry out the foreseen air operation;
at least one of the management parameters offers a predetermined default value;
the method comprises, in the case where it is impossible for the aircraft to carry out the foreseen air operation, informing a crew member of the impossibility;
the method comprises one of the following steps comprising, in the case where it is impossible for the aircraft to carry out the foreseen air operation:
  providing a crew member with an alternative strategy;
  automatically activating an alternative strategy.

In a particular embodiment, the alternative procedure is obtained according to the following steps:
  E1) if one of several RNP values, each representing a half-width of a safety corridor relative to the envisaged air operation, is less than a predetermined value, the method comprises verifying a first condition, namely the existence of an RNP value corresponding to this predetermined value; if this first condition is met, this procedure is chosen as an alternative strategy;
  E2) if in step E1 the first condition is not met, the method comprises verifying a second condition, namely the existence of a non RNP area navigation procedure of the RNAV type superimposed on the chosen RNP AR procedure; if this second condition of step E2 is met, this non RNP area navigation procedure of the RNAV type is chosen as an alternative strategy;
  E3) if in step E2 the second condition is not met, the method comprises verifying a third condition, namely the existence of a conventional procedure superimposed on the chosen RNP AR procedure; if this third condition of step E3 is met, this conventional procedure is chosen as an alternative strategy; and
  E4) if in step E3 the third condition is not met, a missed approach procedure of the air operation is chosen as an alternative strategy.

The present disclosure also relates to a device for automatically managing at least one air operation requiring a guarantee of navigation and guidance performance of an aircraft, the air operation being defined by management parameters, the device comprising activatable monitoring of the air operation and a unit for implementing the air operation configured to initiate the implementation of the air operation at an application point.

According to the disclosure herein, the device comprises moreover:
  a computation unit configured to automatically calculate at least one anticipated activation point as a function of the application point, the anticipated activation point being defined upstream of the application point in the direction of flight of the aircraft; and
  an activation unit configured to automatically activate at least the monitoring when the aircraft reaches, during its flight, the anticipated activation point.

The present disclosure also relates to an aircraft, in particular a transport aircraft, which comprises a device such as the one mentioned above.

BRIEF DESCRIPTION OF THE DRAWINGS

The appended figures will give a good understanding of how the disclosure herein may be embodied. In these figures, identical references denote similar elements.

DETAILED DESCRIPTION

Figure 1:
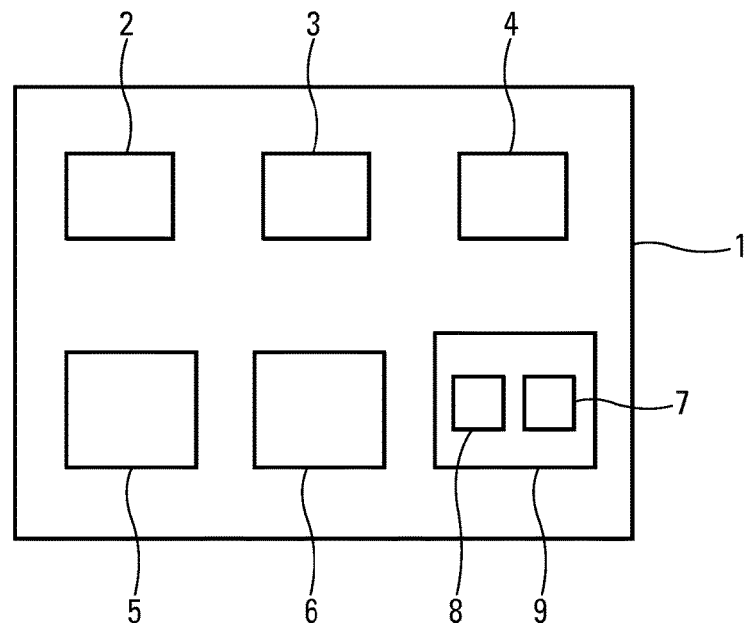
FIG. 1 is a block diagram of a device for automatically managing at least one air operation requiring a guarantee of navigation and guidance performance, making it possible to illustrate the disclosure herein.

The device 1 shown diagrammatically in FIG. 1 and making it possible to illustrate the disclosure herein is installed in an aircraft AC (FIG. 2), in particular a transport aircraft, and is intended to automatically manage at least one air operation requiring a guarantee of navigation and guidance performance.

The air operation is of the RNP AR (Required Navigation Performance with Authorization Required) type. This RNP AR operation is based on an area navigation of the RNAV (aRea NAVigation) type and on required navigation performance operations of the RNP (Required Navigation Performance) type. This air operation is determined, in the usual way, notably using navigation management parameters, which can be stored in a database 6 of the device 1.

The device 1 which is on board the aircraft AC, comprises, in order to do this, a unit 3 for implementing the air operation, configured to implement the air operation, and to do this from a point called the application point.

In the usual way, the device 1 also comprises an activatable monitor or monitoring 2. Monitoring 2 monitors the aircraft AC, during the implementation of such an air operation, in order to check if the capability of the aircraft is compatible with the carrying out of the air operation, in order to make it possible to achieve the safety level set by the air authorities. The capability of the aircraft to carry out an RNP AR air operation can, notably, depend on the following parameters:
  lateral and vertical deviations with respect to a reference trajectory. The deviation of the aircraft must be compatible with the RNP value applicable to the next RNP AR segment;
  the precision and the integrity of a position calculation;
  the precision and the integrity of the guidance of the aircraft;
  the states of the different systems of the device 1 necessary for the implementation of the RNP AR operation.

According to the disclosure herein, the device 1 comprises moreover:
  a computation unit 4 which is configured to calculate automatically at least an anticipated activation point as a function of the application point (at which the air operation is initiated), the anticipated activation point being defined upstream of the application point in the direction of flight of the aircraft; and
  an activation unit 5 which is configured to automatically activate at least the monitoring 2 when the aircraft reaches, during its flight, the anticipated activation point.

The device 1, by anticipating the activation of monitoring 2 with respect to a usual activation, allows the crew to evaluate the real capabilities of the aircraft and in particular the possibility of carrying out the foreseen air operation, upstream of the point of engagement (activation point) of this operation. It thus has the time, if necessary, to carry out appropriate actions and notably to set up an alternative strategy, as described below.

In a particular embodiment, the device 1, or at least some of its means, form part of a flight management system of the FMS (Flight Management System) type of the aircraft.

The device 1 also comprises a set of information sources (not shown) which supply the values of parameters relative to the flight of the aircraft and/or to its environment.

The device 1 furthermore comprises:
- a display unit 7 configured to display and provide information to the crew; and
- an data acquisition (or input) unit 8 which is configured to allow the crew to enter information or data in the device 1.

In a particular embodiment, the display unit 7 and the data input unit 8 form part of a man/machine interface 9 of the device 1.

Figure 2:
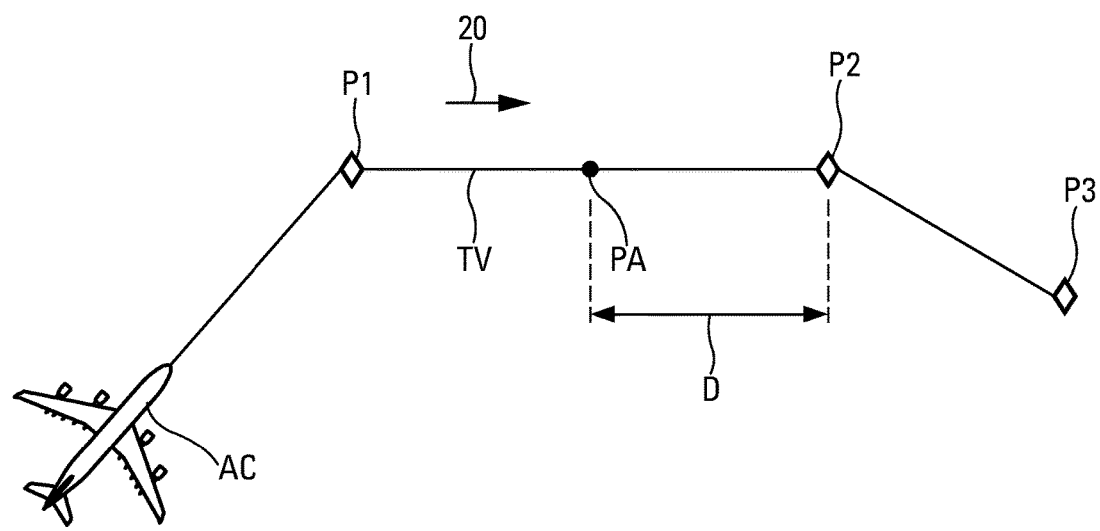
FIG. 2 is a diagrammatic view of an example of an air operation managed by the device shown in FIG. 1.

FIG. 2 shows an example of an approach and of carrying out an air operation such as envisaged in the context of the present disclosure.

In this example, the aircraft AC follows a flight trajectory TV passing through waypoints P1, P2 and P3, preferably conforming to a flight plan, in the direction of flight referenced 20.

As mentioned previously, the computation unit 4 of the device 1 automatically calculates an anticipated activation point PA, as a function of the application point which corresponds in this example to the waypoint P2. The anticipated activation point PA is defined upstream of the application point P2 in the direction of flight 20 along the flight trajectory TV. The activation unit 5 of the device 1 automatically activates monitoring 2 when the aircraft AC reaches, during its flight, this anticipated activation point PA.

The device 1 determines the application point P2 using one or more of the following criteria:
- a start of approach point IAF (Initial Approach Fix) of the air operation;
- an intermediate approach point IF (Intermediate Fix) of the air operation; and
- a specific point defined by the crew.

In a particular embodiment, the computation unit 4 is configured to calculate the anticipated activation point PA by an anticipation in distance, with respect to the application point P2. In this case, the computation unit 4 calculates the anticipated activation point PA at a distance D, starting from the application point P2, upstream of this point (with respect to the direction of flight 20 of the aircraft AC) along the flight trajectory TV.

The computation unit 4 can also calculate the anticipated activation point PA by anticipation in flight time, with respect to the application point P2. In this case, the computation unit 4 takes the speed of the aircraft AC into consideration in order to calculate the distance D and to derive from it the position of the anticipated activation point PA.

Moreover, the device 1 is configured to provide a crew member, prior to the automatic calculation of the anticipated activation point P2 and to the automatic activation of the monitoring 2, with the opportunity to define at least one management parameter (that is to say a parameter that is applicable to the operation), for example using the man/machine interface 9. In a particular embodiment, the device 1 makes provision for requesting the crew member to define at least one of the following management parameters:

- an RNP value representing the half-width of a safety corridor relative to the air operation. This value can be chosen from among the various values applicable to the proposed air operation and conforming with the capabilities of the aircraft with the crew's authorization to operate;
- a minimum decision altitude value corresponding to the chosen RNP value;
- the application point;
- an item of information relative to an anticipation of activation in time or in distance (value of the distance D); and
- possibly an alternative strategy to implement in the case where it is impossible for aircraft to carry out the foreseen air operation, as described below.

In a particular embodiment, at least one of the management parameters offers a default value (predetermined) in the device 1. Thus, by way of example:
- the RNP value can correspond to the smallest RNP value of the whole of the air operation, that is to say of all the different segments of the air operation;
- the application point can correspond to the IAF point or to the start of the first segment of the air operation;
- the anticipation of activation in time can be 2 minutes;
- the anticipation of activation in distance can be 10 NM; and
- the alternative strategy to implement in the case where it is impossible for the aircraft to carry out the foreseen air operation can be the conventional approach closest to the air operation or can correspond to a missed approach procedure of the air operation.

The device 1 therefore invites a crew member to define the parameters by the intermediary of the data input unit 8 of the man/machine interface 9. The device 1 thus gives the crew, which plans to carry out an air operation (generally in the cruise phase), the opportunity to define the elements specific to the planned air operation, the elements of anticipation of activation of the monitorings, as well as an alternative strategy.

During the air operation, the workload of the crew is very high (monitoring deviations, more frequent radio exchanges with air traffic control, change of configuration of the aircraft for the purpose of the landing, . . . ). The device 1 makes it possible, by the anticipation of the definition of the management parameters and/or of the activation of the monitoring 2, to free time for the crew during the air operation.

In a particular embodiment, when an RNP value with an application point is specified by the pilot, for example using the data input unit 8 of the man/machine interface 9, the computation unit 4 calculates one or more anticipated activation points according to the following method:

A) if the specified application point is equal to the IAF point or to the first point of the first RNP AR segment of the air operation, a single anticipated activation point is calculated using the anticipation in distance and/or in time specified for example by the pilot before the application point;

B) if the application point is after the IAF point and the first point of the first RNP AR segment of the air operation, several anticipated activation points are calculated:
  a) for the first RNP AR segment prior to the specified application point, and to each change of RNP value before the specified application point, an anticipated activation point is calculated using the RNP value of the point in question and the anticipation of activation specified by the pilot; and b) at the specified application point, an anticipated activation point is calculated using the RNP value and the anticipation of activation specified by the pilot.

Moreover, the display unit 7 of the device 1 is also configured to display information relative at least to monitorings implemented by the monitoring 2, at the time of the automatic activation of the monitoring 2.

Moreover, the device 1 comprises the monitoring 2 for detecting when it is impossible for the aircraft to carry out a foreseen air operation.

In one embodiment, the display unit 7 of the device 1 is also configured, in the case where it is impossible for the aircraft to carry out the foreseen air operation, to inform and warn a crew member of the impossibility. Other warnings, notably of the audible type, can also be provided for this purpose.

Moreover, according to a first embodiment, the device 1 is configured, in the case where it is impossible for the aircraft to carry out the foreseen air operation, to offer a crew member an alternative strategy such as described below.

Alternatively, according to a second embodiment, the display unit 7 of the device 1 is configured, in the case where it is impossible for the aircraft to carry out the foreseen air operation, to automatically activate such an alternative strategy.

This alternative strategy can be validated by the crew, for example using the data input unit 8, to allow the aircraft to continue its approach towards the destination. The device 1 also offers, for example by the intermediary of the data input unit 8, a system for the rapid activation of the alternative strategy in case of need.

The alternative strategy can be specified by a crew member, as mentioned above. The device 1 also comprises structure, notably the computation unit 4, for automatically defining an alternative strategy.

In a particular embodiment, the alternative strategy is defined and selected (or chosen) automatically according to the following steps:

E1) if one of several RNP values each representing the half-width of a safety corridor relative to the envisaged air operation is less than a predetermined value, for example 0.3 NM, the device 1 verifies a first condition, namely the existence of an RNP value corresponding to this predetermined value; if this first condition is met, this procedure (or operation) is chosen as an alternative strategy;

E2) if in step E1 the first condition is not met, the device 1 verifies a second condition, namely the existence of an area navigation procedure of the RNAV type (but which is not of RNP type) which is superimposed on the chosen RNP AR procedure, that is to say which is provided in addition to the RNP AR procedure (or operation); if this second condition of step E2 is met, this area navigation procedure of the non RNP RNAV type is chosen as an alternative strategy;

E3) if in step E2 the second condition is not met, the device 1 verifies a third condition, namely the existence of a conventional procedure (that is to say a usual approach) which is superimposed on the chosen RNP AR procedure; if this third condition of step E3 is met, this conventional procedure is chosen as an alternative strategy; and E4) if in step E3 the third condition is not met, the missed approach procedure of the air operation is chosen as an alternative strategy.

An example of the use of the device 1 during a flight along a flight trajectory TV, such as shown in FIG. 2, is described below.

At the current position of the aircraft AC, a crew member can define management parameters of an air operation with an application point P2, that is to say the point after which the envisaged air operation must be engaged. Using this application point P2, the computation unit 4 of the device 1 automatically calculates the anticipated activation point PA, upstream of the application point P2 in the direction of flight 20 of the aircraft AC.

The aircraft AC continues its flight along the flight trajectory TV until it reaches the anticipated activation point PA thus calculated, after which the monitoring 2 and the displays used by the display unit 7 are automatically activated. Starting from this time, the device 1 begins to monitor the compatibility of the capability of the aircraft AC with the forthcoming air operation.

The aircraft AC continues its flight and when it arrives at the activation point P2, the air operation is engaged. It can be either the initially foreseen air operation, or an air operation resulting from a chosen alternative strategy. In certain conditions, as mentioned above, the air operation can also be interrupted.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically managing at least one air operation specified by an aircraft navigation specification as requiring a guarantee of navigation and guidance performance of an aircraft, the air operation being defined by management parameters and being monitored by activatable monitoring for checking if the capability of the aircraft is compatible with the implementation of the air operation, the implementation of the air operation being initiated at an application point, the method comprising:

automatically calculating, by at least one processor, at least one anticipated activation point as a function of the application point, the anticipated activation point being defined upstream of the application point in the direction of flight of the aircraft; and automatically activating, by an activation circuit, at least the activatable monitoring for checking if the capability of the aircraft is compatible with the implementation of the air operation when the aircraft reaches, during its flight, the anticipated activation point, wherein checking if the capability of the aircraft is compatible with the implementation of the air operation comprises checking lateral and vertical deviations of the aircraft with respect to a reference trajectory specified by the aircraft navigation specification and determining that the capability of the aircraft is compatible with the implementation of the air operation in response to determining that the lateral and vertical deviations of the aircraft are within reference deviations from the reference trajectory specified by the aircraft navigation specification.

2. The method as claimed in claim 1, comprising displaying information relative at least to monitoring implemented by the monitoring at the time of the automatic activation of the monitoring.

3. The method as claimed in claim 1, wherein calculation of the anticipated activation point is carried out by an anticipation in distance, with respect to the application point.

4. The method as claimed in claim 1, wherein calculation of the anticipated activation point is carried out by an anticipation in flight time, with respect to the application point.

5. The method as claimed in claim 1, comprising a prior step of providing a crew member of the aircraft with the opportunity to define at least one management parameter from among the following management parameters:

an RNP value representing the half-width of a safety corridor relative to the air operation;

the application point;

an item of information relative to an anticipation of activation in time or in distance;

an alternative strategy to be used in the case where it is determined that the aircraft will be unable to provide the guarantee of navigation and guidance performance while implementing the air operation.

6. The method as claimed in claim 1, wherein at least one of the management parameters comprises a predetermined default value.

7. The method as claimed in claim 1, comprising, in the case where it is determined that the aircraft will be unable to provide the guarantee of navigation and guidance performance while implementing the air operation, informing a crew member of the determination.

8. The method as claimed in claim 1, comprising one of the following steps comprising, in case it is determined that the aircraft will be unable to provide the guarantee of navigation and guidance performance while implementing the air operation:

providing a crew member with an alternative strategy; automatically activating an alternative strategy.

9. The method as claimed in claim 8, wherein the alternative strategy is obtained comprising:

E1) if one of several RNP values, each representing a half-width of a safety corridor relative to the envisaged air operation, is less than a predetermined value, the method comprises verifying a first condition, namely the existence of an RNP value corresponding to this predetermined value; if this first condition is met, this procedure is chosen as an alternative strategy;

E2) if in step E1 the first condition is not met, the method comprises verifying a second condition, namely the existence of a non RNP area navigation procedure of the RNAV type superimposed on the chosen RNP AR procedure; if this second condition of step E2 is met, this non RNP area navigation procedure of the RNAV type is chosen as an alternative strategy;

E3) if in step E2 the second condition is not met, the method comprises verifying a third condition, namely the existence of a conventional procedure superimposed on the chosen RNP AR procedure; if this third condition of step E3 is met, this conventional procedure is chosen as an alternative strategy; and E4) if in step E3 the third condition is not met, a missed approach procedure of the air operation is chosen as an alternative strategy.

10. A device for automatically managing at least one air operation specified by an aircraft navigation specification as requiring a guarantee of navigation and guidance performance of an aircraft, the air operation being defined by management parameters, the device being configured for activatable monitoring of the air operation by checking if the capability of the aircraft is compatible with the implementation of the air operation, and the device comprising a unit for implementing the air operation and configured to initiate the implementation of the air operation at an application point, wherein the device comprises:

at least one processor programmed to automatically calculate at least one anticipated activation point as a function of the application point, the anticipated activation point being defined upstream of the application point in the direction of flight of the aircraft; and an activation circuit configured to automatically activate at least the activatable monitoring for checking if the capability of the aircraft is compatible with the implementation of the air operation when the aircraft reaches, during its flight, the anticipated activation point, wherein checking if the capability of the aircraft is compatible with the implementation of the air operation comprises checking lateral and vertical deviations of the aircraft with respect to a reference trajectory specified by the aircraft navigation specification and determining that the capability of the aircraft is compatible with the implementation of the air operation in response to determining that the lateral and vertical deviations of the aircraft are within reference deviations from the reference trajectory specified by the aircraft navigation specification.

* * * * *